(12) United States Patent
Brandt

(10) Patent No.: US 7,570,271 B1
(45) Date of Patent: Aug. 4, 2009

(54) HIGH SPEED DISPLAY OF HIGH RESOLUTION IMAGE

(75) Inventor: Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 246 days.

(21) Appl. No.: 11/352,135

(22) Filed: Feb. 10, 2006

(51) Int. Cl.
G09G 5/00 (2006.01)
G06T 11/40 (2006.01)
G06T 17/00 (2006.01)

(52) U.S. Cl. .................. 345/582; 345/428; 345/552; 345/587

(58) Field of Classification Search .............. 345/428, 345/552, 582, 587
See application file for complete search history.

(56) References Cited

U.S. PATENT DOCUMENTS 6,590,579 B1 * 7/2003 Hong et al. .................. 345/552
6,618,053 B1 * 9/2003 Tanner ....................... 345/552
6,747,649 B1 * 6/2004 Sanz-Pastor et al. ........ 345/428

OTHER PUBLICATIONS

"6.8.3 Implementing High Resolution Textured Terrain", *Advanced Graphics Programming Techniques Using OpenGL—Course presented at SIGGRAPH '99*, http://www.opengl.org/resources/tutorials/sig99/advanced99/notes/node71.html,(observed Jan. 9, 2006), 1 pg.

Huttner, Tobias , "High Resolution Textures", *Proceedings of IEEE Visualization '98*, http://web.archive.org/web/2003041303/http://davinci.informatik.uni-kl.de/vis98/archive/lbht/papers/huettnerA4.pdf,(Oct. 1998),4 pgs.

Montrym, John S., et al., "InfiniteReality: A Real-Time Graphics System", *Computer Graphics, Proceedings of SIGGRAPH '97*, (1997),293-302.

Tanner, Christopher C., et al., "The Clipmap: A Virtual Mipmap", *Computer Graphics, Proceedings of SIGGRAPH '98*, (1998), 151-158.

* cited by examiner

*Primary Examiner*—Hau H Nguyen
(74) *Attorney, Agent, or Firm*—Schwegman, Lundberg & Woessner, P.A.

(57) ABSTRACT

A system maintains data from different resolution levels of an image in textures of a graphics processing unit (GPU). Image data is organized into multiple resolution layers of an image. Data from the lower resolution level(s) is used to process an image while higher resolution data is loaded. In one embodiment, a first resolution representation of the image having a lowest resolution level using data resident in the GPU memory is drawn prior to drawing a portion of a second resolution representation having a higher resolution level using data resident in the GPU memory.

13 Claims, 9 Drawing Sheets

HIGH SPEED DISPLAY OF HIGH RESOLUTION IMAGE

TECHNICAL FIELD

The present application relates generally to computer image processing, and in one example embodiment to a method and apparatus for processing image data for presentation by a computer system.

BACKGROUND

Image processing in computer systems typically allow a user viewing an image to zoom to different resolutions of the image. Further, the user can rotate the image view, and pan around the image at the different zoom levels. One method of processing image data is to organize the data into multiple levels of resolution. Each level can then be used to draw an image at a specified zoom level.

Problems with real-time image display are often experienced when panning and zooming between resolution levels. These problems are manifested by slowing or 'freezing' an image on a screen until the data can be loaded into a graphics processor and displayed at the specified image resolution level.

The available texture memory on a graphics processing unit (GPU) is less than what would be needed to store an entire high resolution image. Also, there is a maximum texture size (e.g., width and height) which is often less than the image size. Therefore, the entire image cannot be stored in texture at once, either in one contiguous piece, or in tiled chunks.

A memory transfer speed (bandwidth) between main memory and the GPU limits how much data can be sent per frame. Therefore, some form of texture cache is warranted since a number of "new" pixels per frame is a lot less than the total number of pixels drawn per frame. A GPU may have a built in mechanism for drawing an image at varying zoom levels called a mip map. Utilizing the GPU mip maps for high resolution images may not be needed or desired.

Mip maps are not necessary within a single drawing operation if the image is oriented strictly perpendicular to the viewing axis. This is because the projected size of an image pixel on the screen is constant across the screen. This would be different if an image were viewed in perspective, or draped over a terrain. Mip maps require extra storage and extra processing to dynamically generate an image. Further, in order to ensure there are no tile seam artifacts at all mip map levels, it would be need to substantially increase a resample border. For instance, a 6 layer mip map with a resample border of 1 pixel, would require a resample border of 64 pixels at the bottom level of the mip map. This drastically reduces the effective area of each tile, therefore requiring more tiles, and making the whole system less efficient.

BRIEF DESCRIPTION OF THE DRAWINGS

Embodiments of the invention may be best understood by referring to the following description and accompanying drawings which illustrate such embodiments. In the drawings.

DETAILED DESCRIPTION

In the following description, numerous specific details are set forth. However, it is understood that embodiments may be practiced without these specific details. In other instances, well-known structures and techniques have not been shown in detail in order not to obscure the understanding of this description. Additionally, in this description, the phrase "example embodiment" means that the embodiment being referred to serves as an example or illustration.

Systems and methods are described herein that improve image processing by maintaining data from different resolution levels of an image in textures of a graphics processing unit (GPU). Data from the lower resolution level(s) can be used to process an image while higher resolution data is loaded. As such slow or frozen images are avoided during interactive zooming and panning.

A method is described herein for organizing image data into multiple resolution layers of an image, wherein each of the multiple resolution layers is divided into data tiles. At least a portion of the image is drawn using each of the multiple resolution layers, wherein data from each of the multiple resolution layers is maintained in cached textures of a GPU.

Another method is described for maintaining a log of data resident in a GPU memory, determining draw coordinates relative to an image, and identifying data for multiple resolution representations of the image corresponding to the draw coordinates. Further the method determines if the identified data is resident in the GPU memory, and draws a first resolution representation of the image having a lowest resolution level using data resident in the GPU memory prior to drawing a portion of a second resolution representation having a higher resolution level using data resident in the GPU memory.

In one example embodiment, a technique is described that utilizes a combination of Central Processing Unit (CPU) and Graphics Processing Unit (GPU) for image processing.

Figure 1:
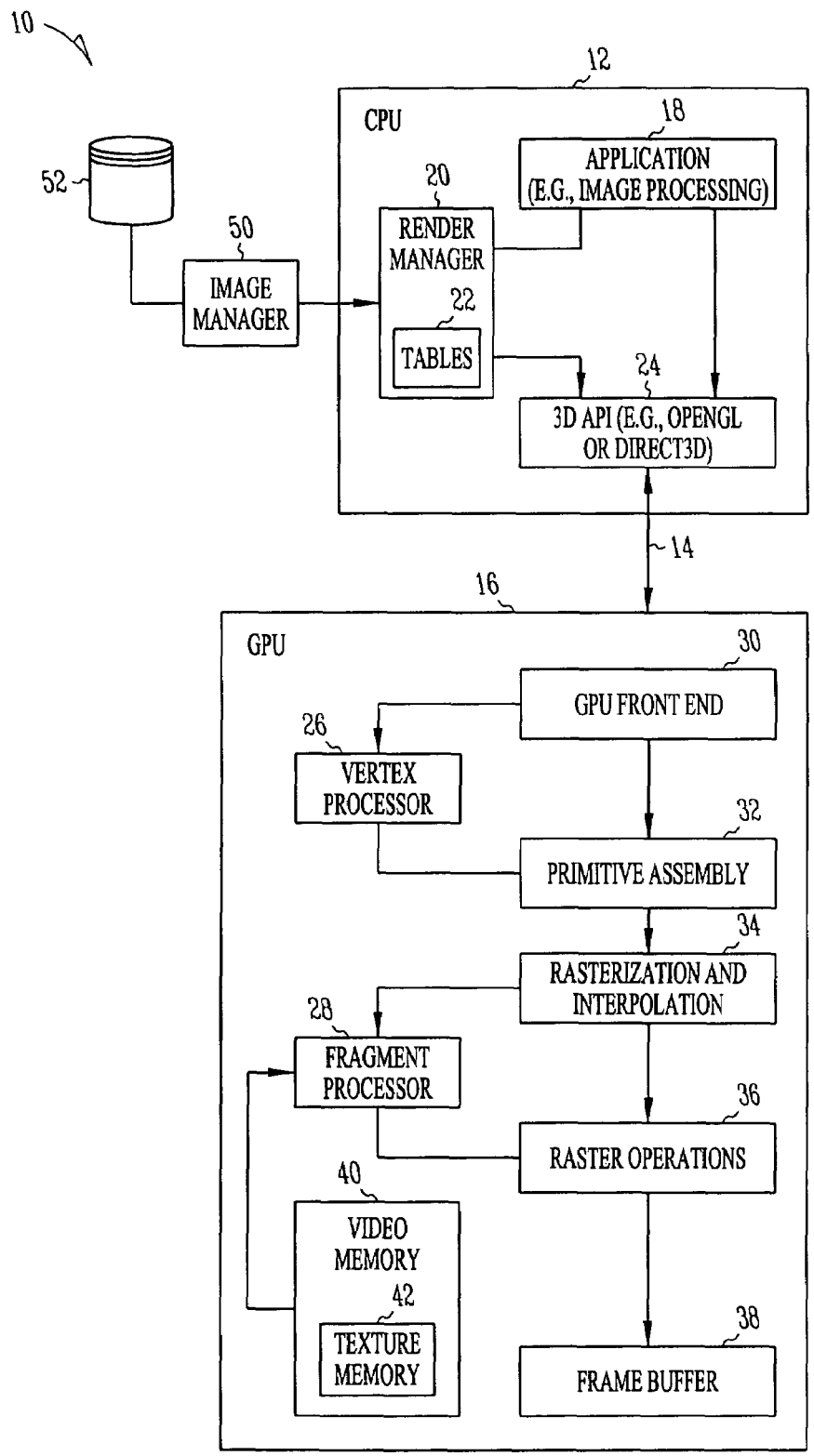
FIG. 1 is a block diagram illustrating a system, according to an example embodiment of the present invention, which may be a personal computer system (PC).

FIG. 1 is a block diagram illustrating a system 10 (e.g., a personal computer system (PC)), within which an example embodiment of the present invention may be implemented and/or executed. The system 10 includes a central processing unit (CPU) 12, which is coupled via an interconnect 14 (e.g., a bus) to a graphics processing unit (GPU) 16. While the CPU 12 and the GPU 16 may be embodied by separated and distinct integrated circuits, the units 12 and 16 may in one embodiment be formed on a single chip die, or in fact be implemented as a unitary integrated circuit. Accordingly, for the purposes of the present application, the terms CPU and GPU may be taken to refer to distinct processing domains, but not necessarily to distinct integrated circuits or components.

While the architecture of the CPU 12 is not explicitly illustrated, the CPU 12 is shown to execute an image processing application module 18. A render manager module 20, including texture tile tables 22, is executed by the application. An image manager module 50 and data storage 52 are used to provide image data to the render manager. The image manager can be a separate module or software executed by the CPU. The render manager module 20 communicates with the GPU 16 via a 3D Application Program Interface (API) 24 (e.g., the OpenGL or the Direct3D APIs). Likewise, the image processor application 18 is furthermore shown to communicate with the GPU 16 via the 3D Application Program Interface (API) 24 (e.g., the OpenGL or the Direct3D APIs).

FIG. 1 also illustrates the logical architecture of an example GPU 16. The example GPU 16 is a stream processor that operates as the core computational unit for a graphics card, and has its own memory for the storage of image data and programs. The example GPU 16 is designed to handle geometric data and includes two types of processors, namely a vertex processor 26 and a fragment processor 28. Dealing more specifically with a graphics processing pipeline that may be implemented by the GPU 16, a GPU front-end 30 operationally receives image data and programs from the image processing application 18 executed by the CPU 12. Specifically, the image processing application 18 may issue 3D API commands to the 3D API 24, which in turn issues GPU commands, and an associated data stream, to the GPU front-end 30. The GPU front-end 30 provides pre-transformed vertices to the vertex processor 26. The vertex processor 26 is programmable, and typically executes a GPU program, in the form of a vertex shader, to generate and output transformed vertices to a primitive assembly pipe stage 32. The GPU front-end 30 also provides a vertex index stream to the primitive assembly pipe stage 32.

Assembled parameters are then communicated from the primitive assembly pipe stage 32 to a rasterization and interpolation pipe stage 34, which is supported by a rasterizer (not shown). Pre-transformed fragments are then provided from the rasterization and interpolation pipe stage 34 to the fragment processor 28, which in turn executes a further GPU program, in the example form of a fragment shader. The fragment processor outputs transformed fragments to a raster operations pipe stage 36. The rasterization and interpolation pipe stage 34 also outputs a stream of pixel locations to the raster operations. The raster operations then provide pixel updates to a frame buffer 38.

Video memory 40 provides a cache storage for the GPU. In one embodiment the memory 40 stores image data that can be used to draw an image to be displayed. Texture memory 42 represents the image data cached in the memory and managed by the render manager module 20, as explained below, to provide an image for viewer display that allows for seamless panning and zooming.

Figure 8:
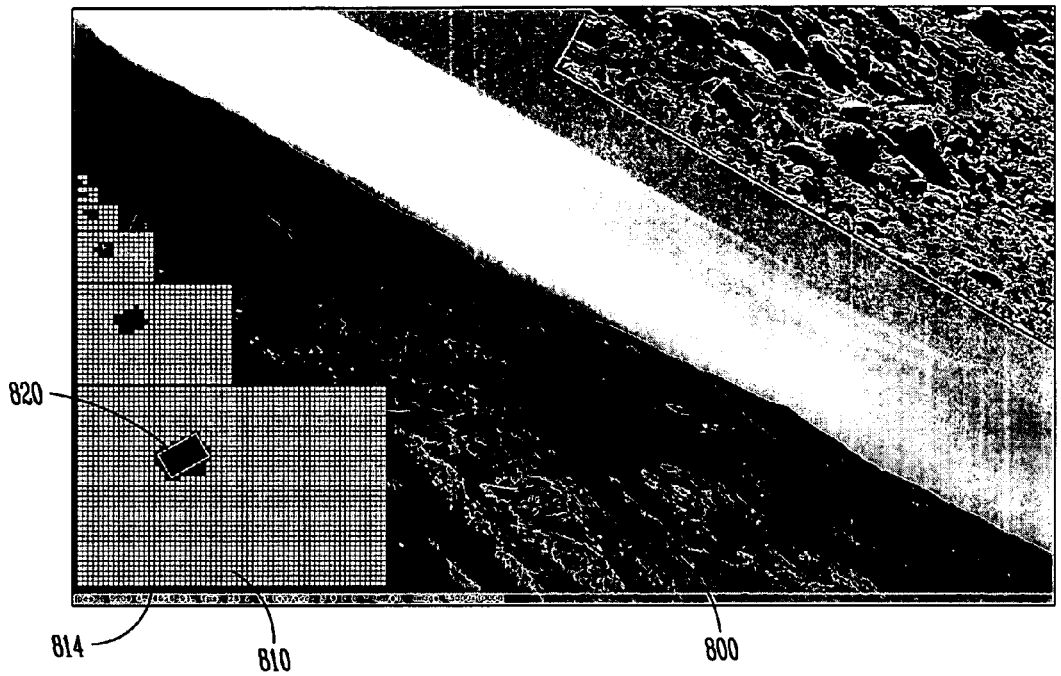
FIG. 8 is an example screen shot illustrating a drawn image and icons illustrating image resolution levels.

Referring first to FIG. 8, an example screen shot of a user display is described to assist in describing embodiments of the disclosure. The screen shot includes an image 800 and superimposed image level representations 810. The image levels represent different zoom views of the image. Each level is divided into tiles. As explained below, each tile is the same size for each level. As such, the highest level 812 of the image is contained in a single tile, while the lowest level 814 is contained in 4096 tiles. The number of tiles at the lowest level is determined by the overall image size. The number of tiles at the highest level can be one or more.

A display icon 820 is provided on the image level representations to identify the portion of the image that is displayed on the screen. It is noted that the coordinates of the screen relative to the image can be defined by both X and Y coordinates, relative position and zoom level. The display icon 820 is illustrated on each level representation and corresponds to tiles cached in the GPU video memory 40.

The following detailed description explains different embodiments for displaying the image using the cached image tiles to provide an improved user display. In one embodiment, the image display is drawn starting at the highest level using data corresponding to the desired screen coordinates and re-drawn at each level until the lowest level at the current zoom is reached. It will be appreciated that as a user pans over the image, data from the higher levels is available from the cache of the GPU even when data from the lower level(s) may not be stored in cache. As such, a continuous image can be displayed which comprises data from different image levels. Although the displayed image may have portions of the overall image drawn at different resolutions, the human eye is less disturbed by the changing display resolution than by prior display techniques that freeze the displayed image while loading new data. In particular since the image is usually in motion when this is happening.

Figure 2:
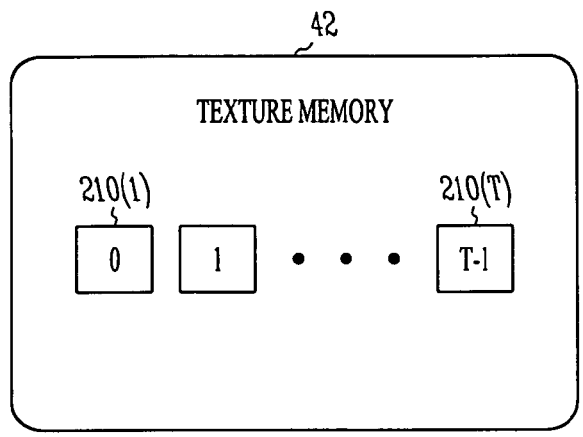
FIG. 2 illustrates an example texture memory.

Referring now to FIG. 2 an example texture memory 42 of the GPU 16 is illustrated. The texture memory 42 is capable of storing a plurality of textures 210 each containing a tile of data from the image level tiles. In one embodiment the memory stores a total of T tiles in texture 210(1) to 210(T). It will be appreciated that the contents of the texture memory changes as the GPU draws different image tiles. The embodiment described above which draws the highest levels keeps some of the cached tiles in the GPU filled with coarser resolution(s) of the image. By maintaining these tiles in cache, panning and zooming can be more efficiently displayed for a user. That is, maintaining a fixed pool of textures (rather than constantly reallocating them) the GPU can do a better job of texture memory management and consequently achieve better performance.

Figure 3:
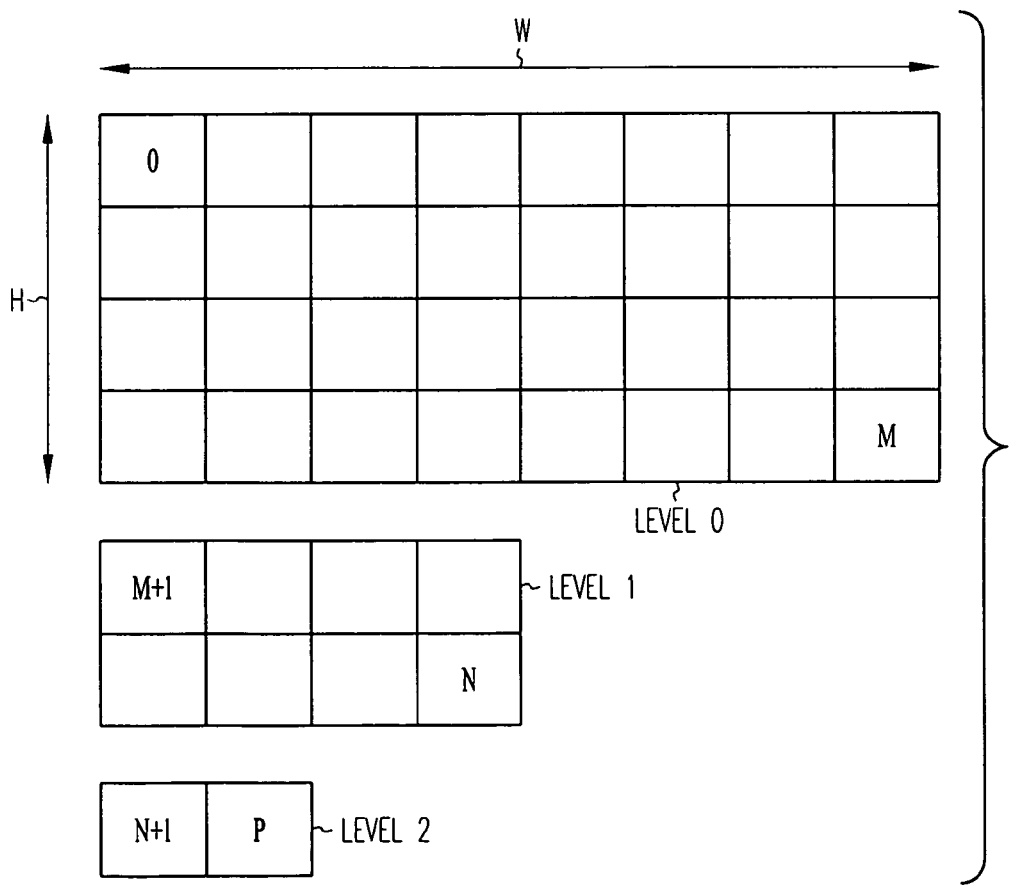
FIG. 3 illustrates an example image resolution levels.

Referring to FIG. 3 sample image resolution levels, or representations, are described. Each level (level 0, level 1 and level 2) is divided into tiles. The tiles are equal size intra-level and inter-level. As illustrated, Level 0 includes M+1 tiles, Level 1 is ¼ the size of Level 0 with N−M tiles, and Level 2 is ¼ the size of Level 1 with P−N tiles. The image has a total of A tiles as a sum of all tiles in all levels. As such, each tile in the image levels has an indexed address, as explained below.

The illustrated levels are provided to assist in understanding the present disclosure and are not intended to limit the invention. In different embodiments the number of tiles per level can be changed. For example, the highest level can contain one or more tiles. In FIG. 3 the highest level includes two tiles. Each level has a width W(level) and a height H(level). Likewise, each image tile has an equal width ($\Delta X$) and an equal height ($\Delta Y$). In one embodiment each tile has a $\Delta X=256$ pixels and a $\Delta Y=256$ pixels. Coordinates (qx, qy) for each pixel of the image can be mapped to a tile address using Px=qx/$\Delta X$ and Py=qy/$\Delta Y$ (where a/b represents integer division, where, the largest integer that is not greater than the real-valued quotient of a over b). Each tile has an address, therefore, of:

Tile Address $(Px,Py,\text{level})$=Index Offset[level]+$Py*Nx$[level]+$Px$, where Index Offset[0]=0, Index Offset[level]=Index Offset [level−1]+ $Nx$[level]*$Ny$[level], Nx[level]=The number of tiles in a row per level=
(width(level)−1)/ΔX+1, and Ny[level]=The number of tiles in a column per level=
(height(level)−1)/ΔY+1.

During a draw operation the tiles stored in the texture memory are used as needed when available in texture. The cached tiles are tracked by the render manager module 20 and the tile addresses. These cached tiles can contain exactly the same data as an image tile, or more data than the image tile. Specifically, by storing the image tile and a portion of the adjacent image tiles, the system can draw overlapping portions of a filtered version of the image to enhance the displayed view.

Figure 4:
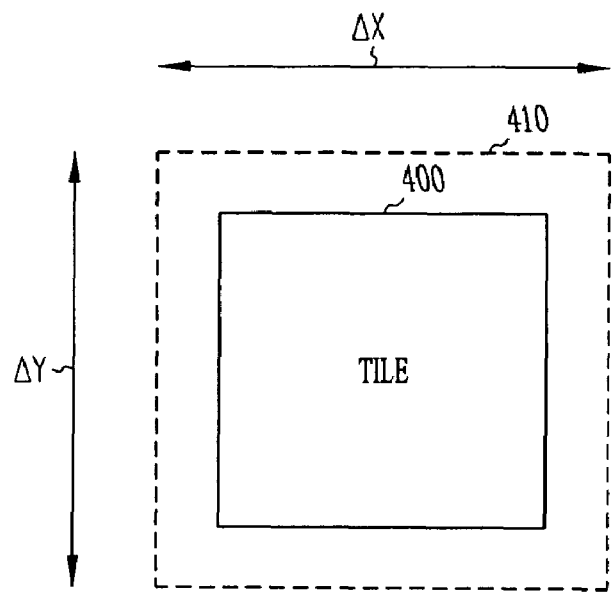
FIG. 4 illustrates an example image tile with resample border.

Referring to FIG. 4, one embodiment of a cache tile is illustrated. The tile includes an image tile 400 and a resample border 410. The resample border 410 includes data from adjacent image tiles. As such, each cache tile has a Tilewidth and a Tileheight, where Tilewidth=ΔX+2*resample border and Tileheight=ΔY+2*resample border. In one embodiment the resample border is one bit, or pixel. A resample border of one pixel is sufficient to allow for bilinear resampling as the image is drawn by the GPU without introducing visible seams along the tile boundaries. A larger border is needed for other resampling methods. For instance, bicubic resampling requires a tile border of 2 pixels. Portions of tiles protruding into the exterior of the image are filled with a background color (such as black).

Figure 5:
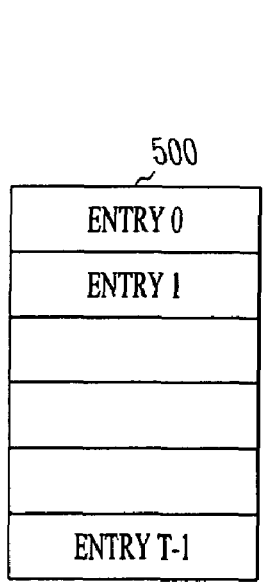
FIG. 5 illustrates an example Tile Texture table.
Figure 6:
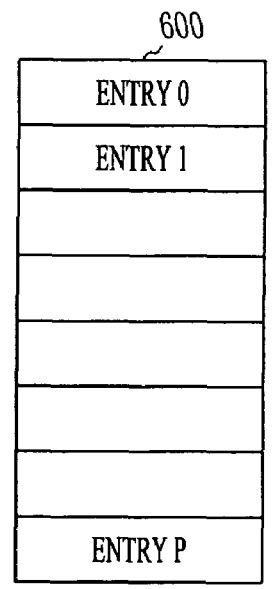
FIG. 6 illustrates an example Tile Index Table.

Referring now to FIGS. 5 and 6, two data structures that can be maintained by the Tables 22 of the render manager module 20 are described. The first table is a Tiled Texture Cache table 500 having table entries 0 to T−1 corresponding to the textures 210 of the Texture Memory 42. When a tile is stored in a texture of the cache memory, its tile address or other indication is loaded into the Tiled Texture Cache table 500. As such, a log of the cache contents is maintained.

The second table is a Tile Index Table 600 that has an entry corresponding to each tile of each level of the image, A entries. A value of 0 to T−1 is maintained in the entry location for the T tiles residing in the cached textures. If the tile is not resident in the cache, a value of T or greater can be placed in the table. This table, therefore, complements the Tiled Texture Table 500. In summary, table 500 is a forward looking table indicating the content of the cache textures, and table 600 is a feedback table of the current status of each tile of the different levels. In different embodiments, either one of the table or a combination of both tables are used to track the cache contents.

Figure 7A:
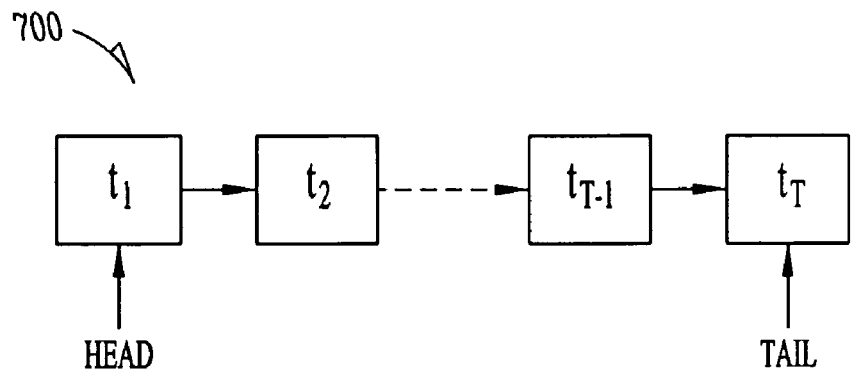
FIGS. 7A, 7B and 7C illustrate an LRU linked list, according to an example embodiment.
Figure 7B:
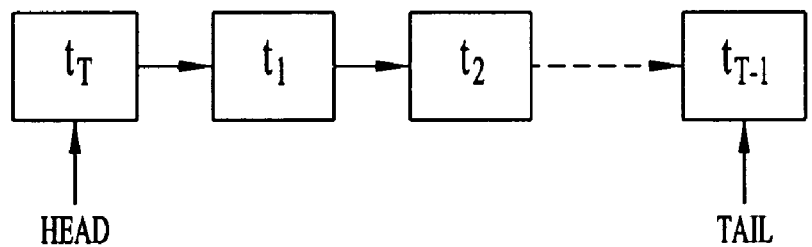
Figure 7C:
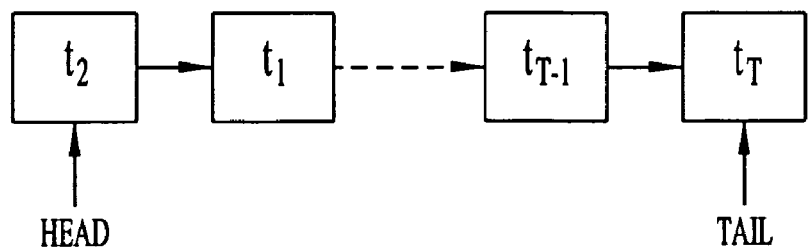

Referring to FIGS. 7A, 7B and 7C, a linked list 700 for tracking the least recently used (LRU) status of the cache textures is explained. The LRU is used to load identified data tiles obtained from a storage location in reclaimed cache textures. The list 700 has T entries (t1 to $t_T$) corresponding to the T textures in texture memory 42. During a draw operation the status of the textures is managed by the render manager module 20. If an image tile that is to be drawn is not resident within the cache, the last entry in the list is moved from the tail to the head, as illustrated in FIG. 7B. In this event, the corresponding texture represented by the element at the tail of the list is replaced with pixels from the image tile that is to be drawn. If during a draw operation the tile is resident within the cache, the link list is updated by removing the corresponding texture location and placing it at the head of the list, such as illustrated in FIG. 7C where texture t2 is moved.

Figure 9A:
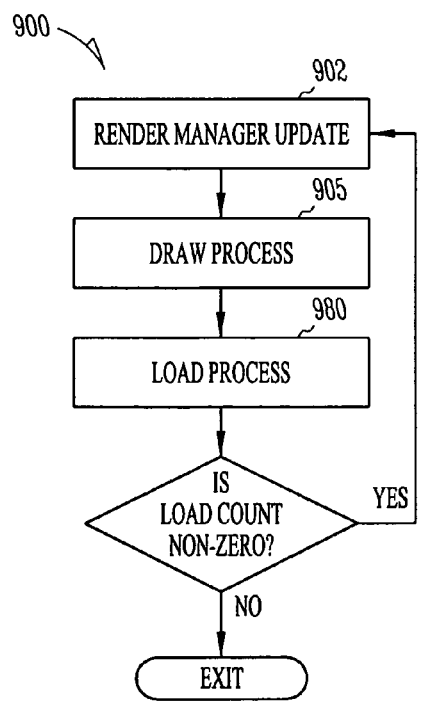
FIGS. 9A, 9B, 9C and 10 are flow charts of example embodiments of the disclosure.

FIG. 9A illustrates a flow chart for embodiments 900 of image drawing and loading. At operation 902 a render manager update is initiated. The update first executes a draw process 905, which is described below in reference to FIG. 9B. Following the draw process, a load process 980 is executed to load data tiles. Process 980 is described below in reference to FIG. 9C. Following the load process, if a load tile count is non-zero (tiles were loaded in load operation) a new render manager update 902 is initiated.

Figure 9B:
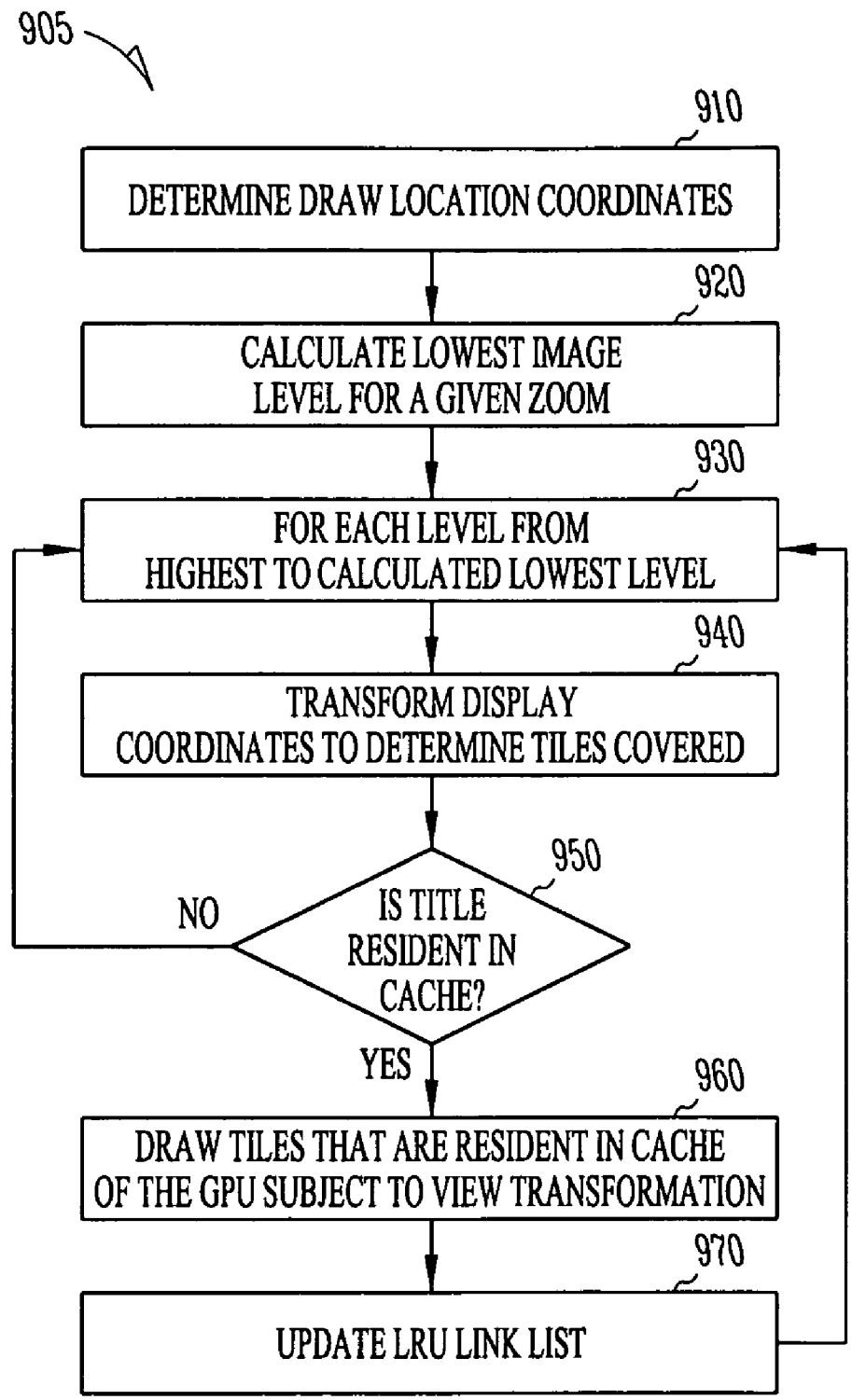

Referring to FIG. 9B, draw operation 905 is described. At operation 910 the coordinates of the screen view are determined relative to the image for each level of the image. The lowest level is determined for the view zoom at 920. The lowest level can be calculated as: max(−log_2(zoom)+bias, 0), where bias>=0 (usually <1).

At 930, for each level starting at the highest to the level determined by the zoom, a series of operations is performed. For each level the display coordinates are used to determine the corresponding tile(s) covered by intersecting the displayed image, at operation 940. This can be performed using known techniques, such as a standard line rasterization technique. At 950, once the tiles are identified it is determined if the tile is resident in the cached textures. In one embodiment the render manager module 20 uses the Tiled Texture Table 500 and/or the Tile Index Table 600 to determine if a texture 210 contains the desired tile data. If a tile is resident in the cache, the GPU draws the stored tile subject to appropriate view transformation at operation 960. It will be appreciated that the view transformation may use all or a portion of the tile, depending upon the display coordinates of a current view. Finally, the LRU link list 700 is updated at operation 970 to move the corresponding texture to the head of the list. When all levels have been drawn, the draw process is complete and the load process is executed.

If a tile at a level being drawn is not resident, a load operation is launched at 980 to retrieve the desired tile data using the CPU. In one embodiment, a fixed budget of tiles is loaded after completing each draw operation. As long as not all tiles are resident in the GPU, the render manager module 20 keeps issuing draw operations (once per screen refresh interval) in order to catch up. When the image stops moving, eventually all the tiles are loaded, and drawing stops. As such, a more seamless continuous real-time display is provided.

Figure 9C:
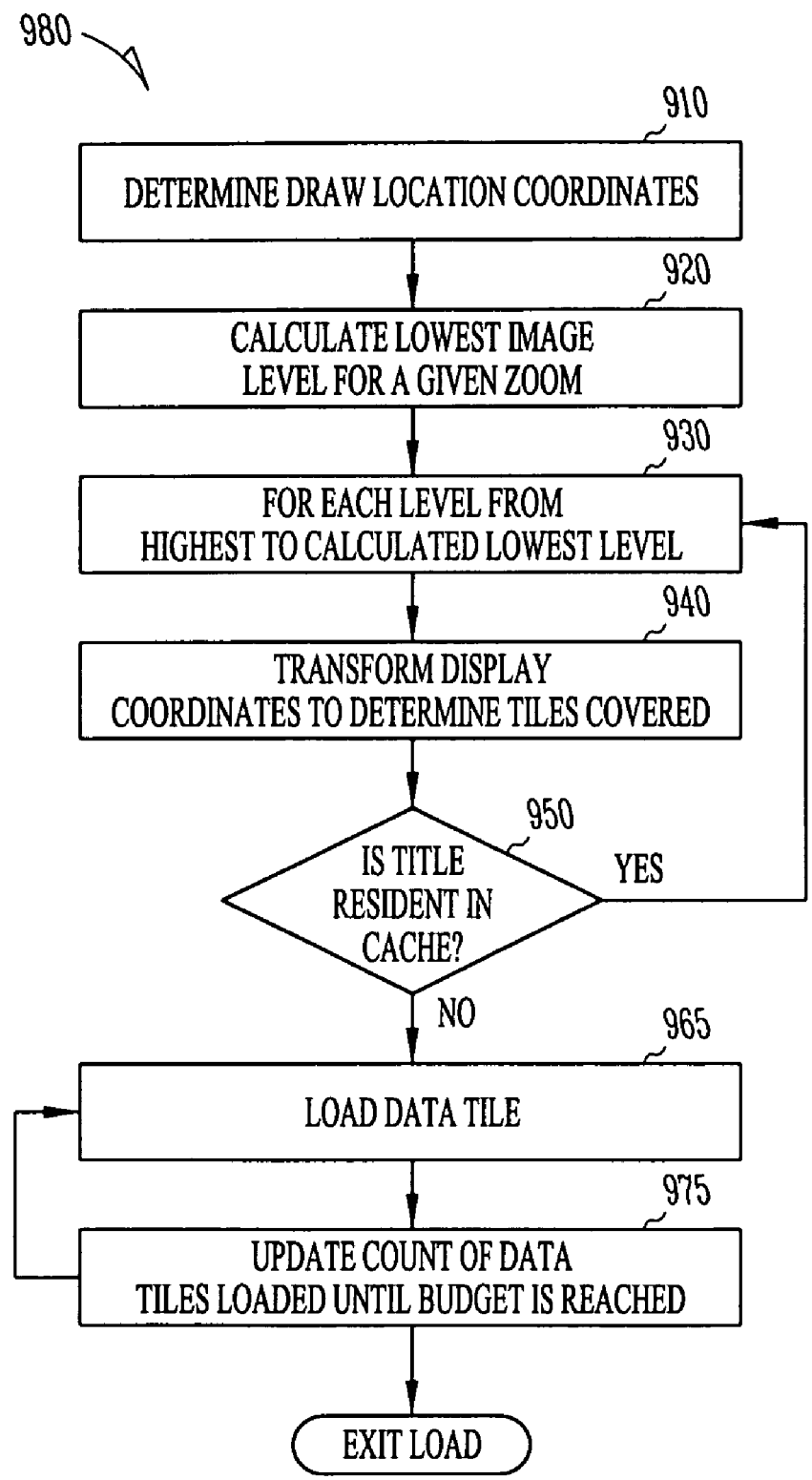

Referring to FIG. 9C, a load process 980 is described. In one embodiment, the initial operations are the same as the draw process. That is, at operation 910 the coordinates of the screen view are determined relative to the image for each level of the image. The lowest level is determined for the view zoom at 920, and at 930, for each level starting at the highest to the level determined by the zoom, a series of operations are performed. Also, for each level the display coordinates are used to determine the corresponding tile(s) covered by intersecting the displayed image, at operation 940.

At 950, once the tiles are identified it is determined if the tile is resident in the cached textures. If the tile is resident, the operation continues to evaluate each level. If the tile is not resident, a data tile is loaded at operation 965 and a counter is incremented at operation 975. Additional tiles are loaded until a budget is reached, or no additional tiles need to be loaded. The load operation is completed when the budget is reached. Alternatively, if no tiles are loaded in the load operation (zero loaded tiles) the operation is exited. Referring back to FIG. 9A, if tiles were loaded a new render manager update 902 is launched and the loaded data tiles will be drawn in draw process 905. When all tiles have been drawn and loaded, the image draw is complete.

Figure 10:
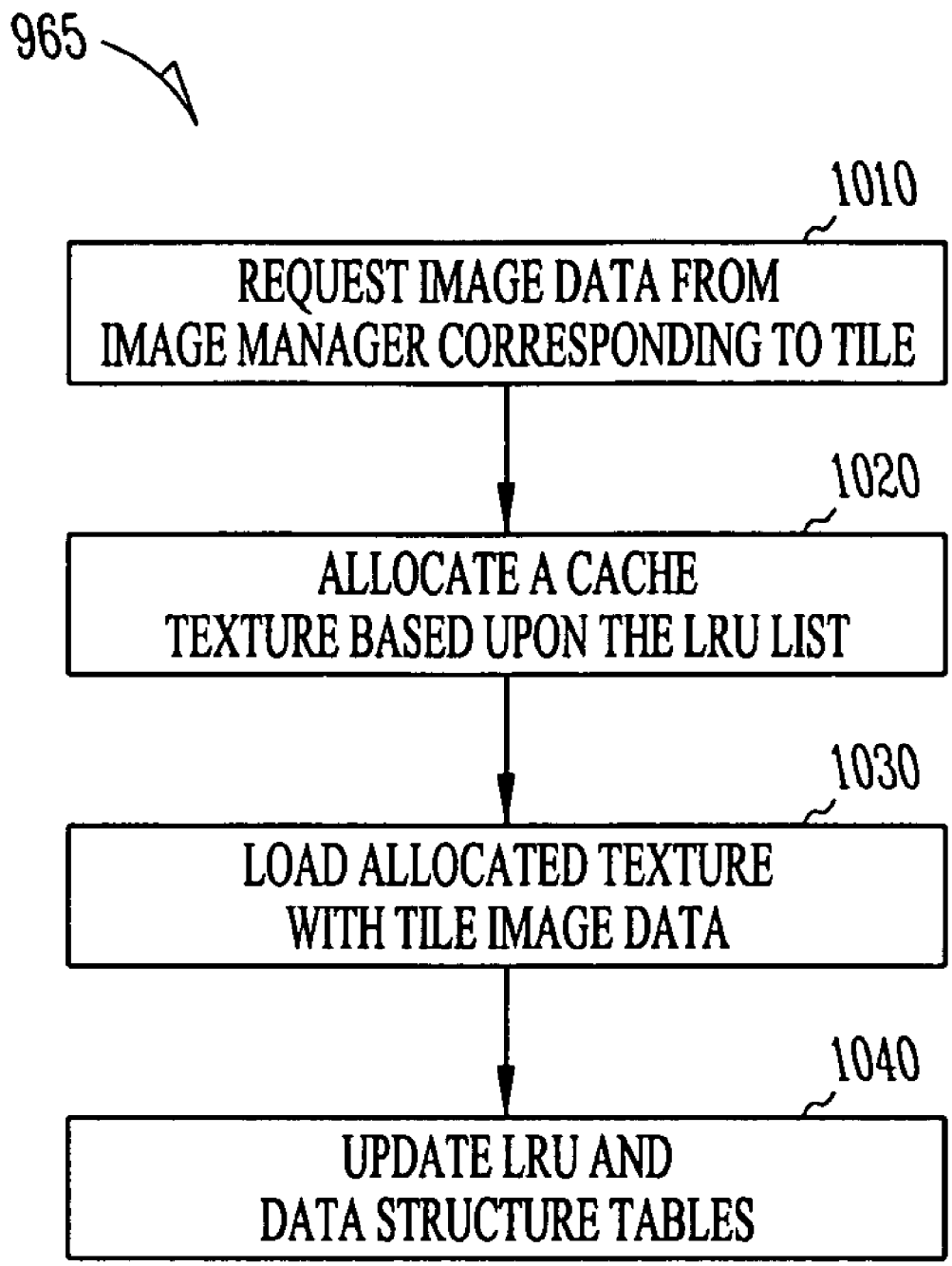

Referring to FIG. 10, one embodiment of a load data tile operation 965 is described. At operation 1010 the render manger module 20 requests image data from image manager module 50. It will be appreciated that the image data can be stored in any manner and may require one or more translation operations to extract the image data corresponding to a specific tile address. A cache texture of the GPU is allocated for use with the loaded tile data at operation 1020. In one embodiment, the LRU link list 700 is used to identify a least used texture to load the tile data. The allocated tile is loaded at operation 1030. At operation 1040, the LRU link list 700 and the Tiled Texture Table 500 and/or the Tile Index Table 600 are updated to maintain a current status of the GPU memory.

In one embodiment, a method includes organizing image data into multiple resolution layers of an image, wherein each of the multiple resolution layers is divided into data tiles. At least a portion of the image is drawn using at least first and second resolution layers of the multiple resolution layers, wherein data from each of the first and second resolution layers is maintained in cached textures of a graphics processing unit (GPU). Each data tile of each of the multiple resolution layers can have an equal data capacity.

In one embodiment, drawing at least a portion of the image using each of the multiple resolution layers includes determining draw coordinates relative to the image data, identifying data tiles for each of the first and second resolution layers corresponding to the draw coordinates, determining which of the identified data tiles are maintained in the cached textures, and drawing the identified data tiles determined to be maintained in the cached textures. Determining which of the identified data tiles are maintained in the cached textures can include maintaining a content log of the cached textures. The identified data tiles that are not maintained in the cached textures can be obtained from a storage location. The identified data tiles obtained from the storage location can be loaded in reclaimed cache textures, wherein the reclaimed cache textures are determined using a least recently used list. A fixed budget of data tiles can be loaded during an image frame update.

Drawing at least a portion of the image using the at least first and second resolution layers of the multiple resolution layers can include drawing the first resolution layer having a lowest resolution level prior to drawing the second resolution layer having a higher resolution level. Further, the data tiles can be drawn having overlapping borders to avoid image seams between drawn data tiles. Finally, only data tiles from lower resolution layers of the multiple resolution layers that are not completely covered by data tiles of higher resolution layers of the multiple resolution layers are drawn in one embodiment.

Figure 11:
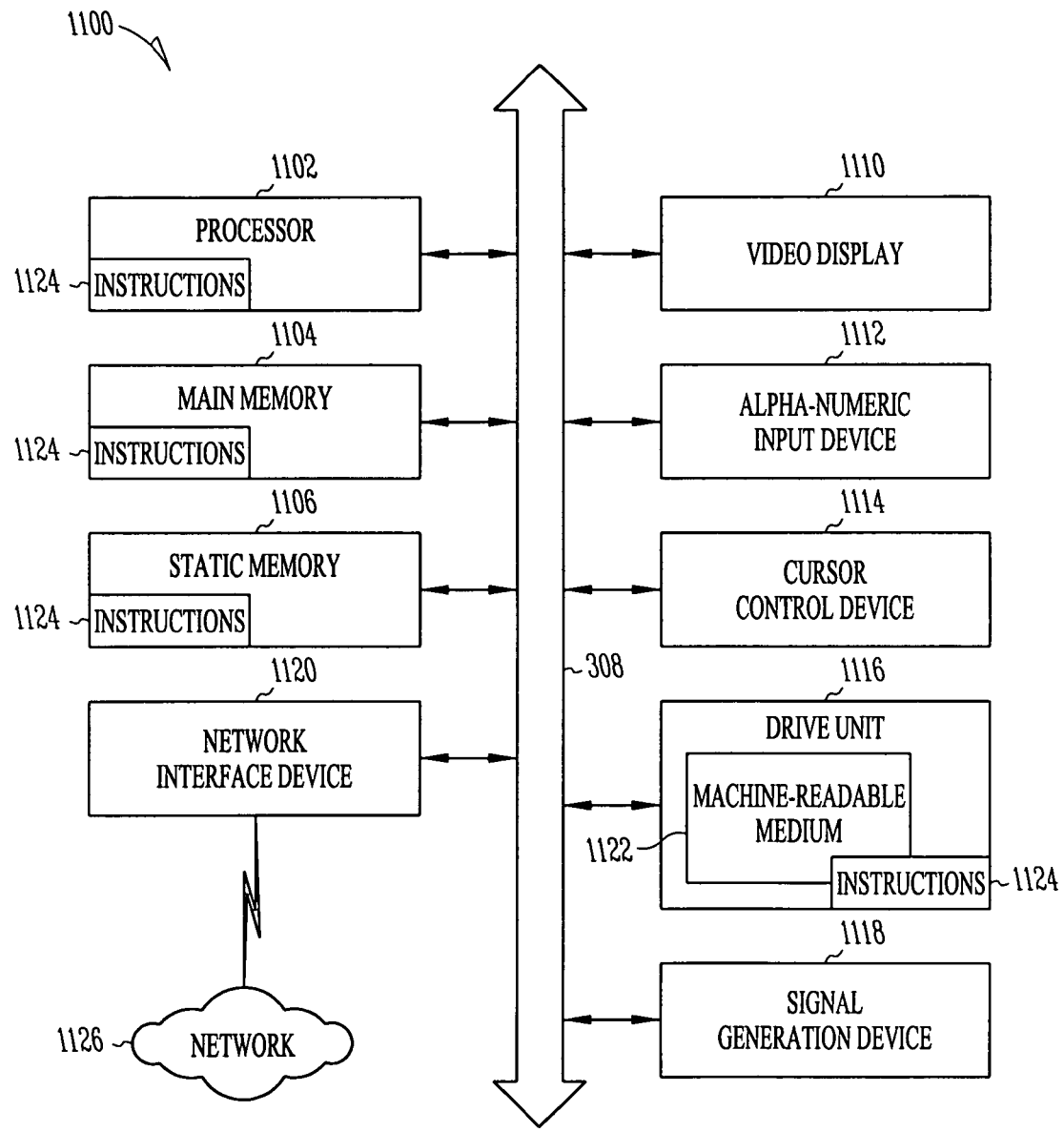
FIG. 11 shows a diagrammatic representation of machine in the exemplary form of a computer system within which a set of instructions, for causing the machine to perform any one or more of the methodologies discussed herein, may be executed.

FIG. 11 shows a diagrammatic representation of machine in the exemplary form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 one or more processors 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions and data structures (e.g., software 1124) embodying or utilized by any one or more of the methodologies or functions described herein. The software 1124 may also reside, completely or at least partially, within the main memory 1104 and/or within the processor 1102 during execution thereof by the computer system 1100, the main memory 1104 and the processor 1102 also constituting machine-readable media.

The software 1124 may further be transmitted or received over a network 1126 via the network interface device 1120 utilizing any one of a number of well-known transfer protocols (e.g., HTTP).

While the machine-readable medium 1122 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of embodying, a storing, encoding or carrying a set of instructions for execution by the machine and that cause the machine to perform any one or more of the methodologies described above, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The above detailed description sets forth embodiments that sequentially draw each level of the image from highest to lowest level. In an alternate embodiment, the render manager module calculates all tiles needed to draw the image at a given level. If the resident tiles at a given level completely cover a tile at a higher level, then the tile at the higher level is not drawn at all. On some systems this can result in improved performance since less drawing is done overall. That is, it avoids drawing a tile if it is going to be completely covered by lower levels. The cost of doing this is increased CPU processing to do the calculation.

Alternatively, the Z depth of the GPU can be used to draw the different levels of the image. That is, one embodiment draws all sequential levels at a Z depth of zero, effectively overwriting the previous level. Another embodiment draws the tiles for each level at a different Z depth. The highest image level is drawn at a Z depth of zero and lower image levels are drawn at progressively deeper Z depths. The GPU will display only those pixels with the smallest Z depth value. In this embodiment, the levels are drawn as described above, but from lowest to highest level (instead of vice versa). If a pixel location at a higher level is already covered by a pixel at a lower level then the one at the higher level is not drawn because it fails the z depth test, and is discarded by the GPU. On some systems this could improve performance by reducing the amount of data needed to be sent to the frame buffer.

For example, in one embodiment a method includes organizing image data into multiple resolution layers of an image, wherein each of the multiple resolution layers is divided into data tiles. At least a portion of the image is drawn using each of the multiple resolution layers. Where each of the multiple resolution layers is drawn using a z-buffer of a graphics processing unit (GPU), and each of the multiple resolution levels has a different z-value. Further the method can include utilizing a GPU z-buffer test to draw only a highest available resolution at each pixel of the image.

In the description, numerous specific details such as logic implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A number of figures show block diagrams of systems and apparatus for software, in accordance with some embodiments of the invention. A flow diagram illustrates the operations for software, in accordance with some embodiments of the invention. The operations of the flow diagram are described with references to the systems/apparatus shown in the block diagrams. However, it should be understood that the operations of the flow diagram could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. Therefore, the specification and drawings are to be regarded in an illustrative rather than a restrictive sense.

What is claimed is:

1. A method comprising:
   organizing image data into multiple resolution layers of an image, wherein each of the multiple resolution layers is divided into data tiles;
   maintaining data from each of at least first and second resolution layers of the multiple resolution layers in cached textures in a graphics processing unit (GPU); and
   drawing at least a portion of the image using at least first and second resolution layers of the multiple resolution layers, the drawing comprising:
      determining draw coordinates relative to the image data;
      identifying data tiles for each of the first and second resolution layers corresponding to the draw coordinates;
      determining which of the identified data tiles are maintained in the cached textures, the determining comprising maintaining a content log of cached textures; and
      drawing the identified data tiles determined to be maintained in the cached textures.

2. The method of claim 1, wherein each data tile of each of the multiple resolution layers has an equal data capacity.

3. The method of claim 1 further comprising obtaining the identified data tiles that are not maintained in the cached textures from a storage location.

4. The method of claim 3 further comprising loading the identified data tiles obtained from the storage location in reclaimed cache textures, wherein the reclaimed cache textures are determined using a least recently used list.

5. The method of claim 4 wherein a fixed budget of data tiles are loaded during an image frame update.

6. The method of claim 1 wherein drawing at least a portion of the image using the at least first and second resolution layers of the multiple resolution layers comprises drawing the first resolution layer having a lowest resolution level prior to drawing the second resolution layer having a higher resolution level.

7. The method of claim 1 wherein drawing comprises drawing data tiles having overlapping borders to avoid image seams between drawn data tiles.

8. The method of claim 1 wherein drawing comprises drawing only data tiles from lower resolution layers of the multiple resolution layers that are not completely covered by data tiles of higher resolution layers of the multiple resolution layers.

9. A system comprising:
   a graphics processing application module to control image drawing via a graphics processing unit (GPU), the module comprising instructions executable by one or more processors, the instructions retained in machine-readable storage media;
   a render manager module to:
      organize image data into multiple resolution layers of an image, wherein each of the multiple resolution layers is divided into data tiles;
      maintain a log of data resident in a GPU memory;
      determine draw coordinates relative to the image data;
      identify data tiles for each of the multiple resolution layers corresponding to the draw coordinates;
      determine which of the identified data tiles are maintained in the textures using a content log of the textures; and
   a GPU configured to draw at least a portion of the image using each of the multiple resolution layers by drawing the identified data tiles determined to be maintained in the textures.

10. The system of claim 9 wherein each data tile of each of the multiple resolution layers has an equal data bit capacity.

11. The system of claim 9 wherein the render manager module is to maintain a list of least recently used textures.

12. The system of claim 9 wherein the render manager module is to obtain the identified data tiles that are not maintained in the cached textures from a storage location, and the GPU is to draw the identified data tiles obtained from the storage location.

13. The system of claim 9 wherein the GPU is to draw a first resolution layer having a lowest resolution level prior to drawing a second resolution layer having a higher resolution level.

* * * * *